United States Patent
Chen et al.

(10) Patent No.: US 8,863,581 B2
(45) Date of Patent: Oct. 21, 2014

(54) DIGITAL PRESSURE GAUGE

(75) Inventors: Andy Chen, New Taipei (TW); John He, New Taipei (TW)

(73) Assignee: Kita Sensor Tech. Co., Ltd., New Taipei (TW)

( * ) Notice: Subject to any disclaimer, the term of this patent is extended or adjusted under 35 U.S.C. 154(b) by 331 days.

(21) Appl. No.: 13/454,773

(22) Filed: Apr. 24, 2012

(65) Prior Publication Data

US 2013/0160561 A1 Jun. 27, 2013

(30) Foreign Application Priority Data

Dec. 22, 2011 (TW) .............................. 100224257 U

(51) Int. Cl.
*G01L 9/00* (2006.01)

(52) U.S. Cl.
USPC ........................................................ 73/753

(58) Field of Classification Search
None
See application file for complete search history.

(56) References Cited

U.S. PATENT DOCUMENTS

2007/0112299 A1* 5/2007 Smit et al. ...................... 604/67

* cited by examiner

*Primary Examiner* — Lisa Caputo
*Assistant Examiner* — Brandi N Hopkins
(74) *Attorney, Agent, or Firm* — Frommer Lawrence & Haug LLP; Ronald R. Santucci

(57) ABSTRACT

A digital pressure gauge is configured for coupling with an external fluid pipe, and includes a housing, a pressure sensing unit, a battery seat and a cover. The housing includes an inlet for coupling with the external fluid pipe to permit flow of fluid from the external fluid pipe into the housing. The pressure sensing unit is operable to sense fluid pressure of the fluid flowing through the inlet. The battery seat is disposed in the housing for receiving a battery. The housing is formed with an opening registered with the battery seat to permit placement of the battery in and removal of the battery from the battery seat through the opening. The cover is removably attached to the housing.

6 Claims, 7 Drawing Sheets

US 8,863,581 B2

DIGITAL PRESSURE GAUGE

CROSS-REFERENCE TO RELATED APPLICATION

This application claims priority of Taiwanese Application No. 100224257, filed on Dec. 22, 2011, the disclosure of which is incorporated herein by reference.

BACKGROUND OF THE INVENTION

1. Field of the Invention

The invention relates to a pressure gauge, more particularly to a digital pressure.

2. Description of the Related Art

In Taiwanese patent no. M405568, there is disclosed a conventional digital pressure gauge. The digital pressure gauge includes a housing, a pressure sensor disposed in the housing, and a display unit. A power unit, such as a battery, is disposed in the housing for providing electricity. However, when the battery needs replacement, or when it is required to test functionality of the digital pressure gauge, parts of the digital pressure gauge, including the housing, need to be detached in order to perform the above operations, which may result in some inconvenience.

SUMMARY OF THE INVENTION

Therefore, the object of the present invention is to provide a digital pressure gauge that facilitates battery replacement and testing of functionality thereof.

Accordingly, a digital pressure gauge of the present invention is configured for coupling with an external fluid pipe. The digital pressure gauge comprises a housing, a pressure sensing unit, a first electronic circuit unit, a second electronic circuit unit, a display module, a battery seat and a cover.

The housing includes an inlet for coupling with the external fluid pipe to permit flow of fluid from the external fluid pipe into the housing.

The pressure sensing unit is disposed in the housing at a position corresponding to the inlet and is operable to sense fluid pressure of the fluid flowing through the inlet and to generate a pressure signal corresponding to the fluid pressure sensed thereby.

The first electronic circuit unit is disposed in the housing and is electrically connected to the pressure sensing unit for receiving the pressure signal therefrom.

The second electronic circuit unit is disposed in the housing, is spaced apart from the first electronic circuit unit, and is electrically connected to the first electronic circuit unit for receiving the pressure signal therefrom. The second electronic circuit unit is operable to convert the pressure signal to a display signal. The second electronic circuit unit includes a power switch for activating and deactivating the second electronic circuit unit. The second electronic circuit unit further includes at least one test contact for testing functionality of at least one of the first and second electronic circuit units.

The display module is disposed on the housing and is visible outwardly of the housing. The display module is electrically connected to the second electronic circuit unit for receiving the display signal therefrom.

The battery seat is disposed in the housing for receiving a battery, and is electrically connected to at least one of the first and second electronic circuit units.

The housing is formed with an opening registered with the battery seat to permit placement of the battery in and removal of the battery from the battery seat through the opening.

The cover is removably attached to the housing, and includes a display area for viewing of the display module, and a press component for actuating the power switch.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
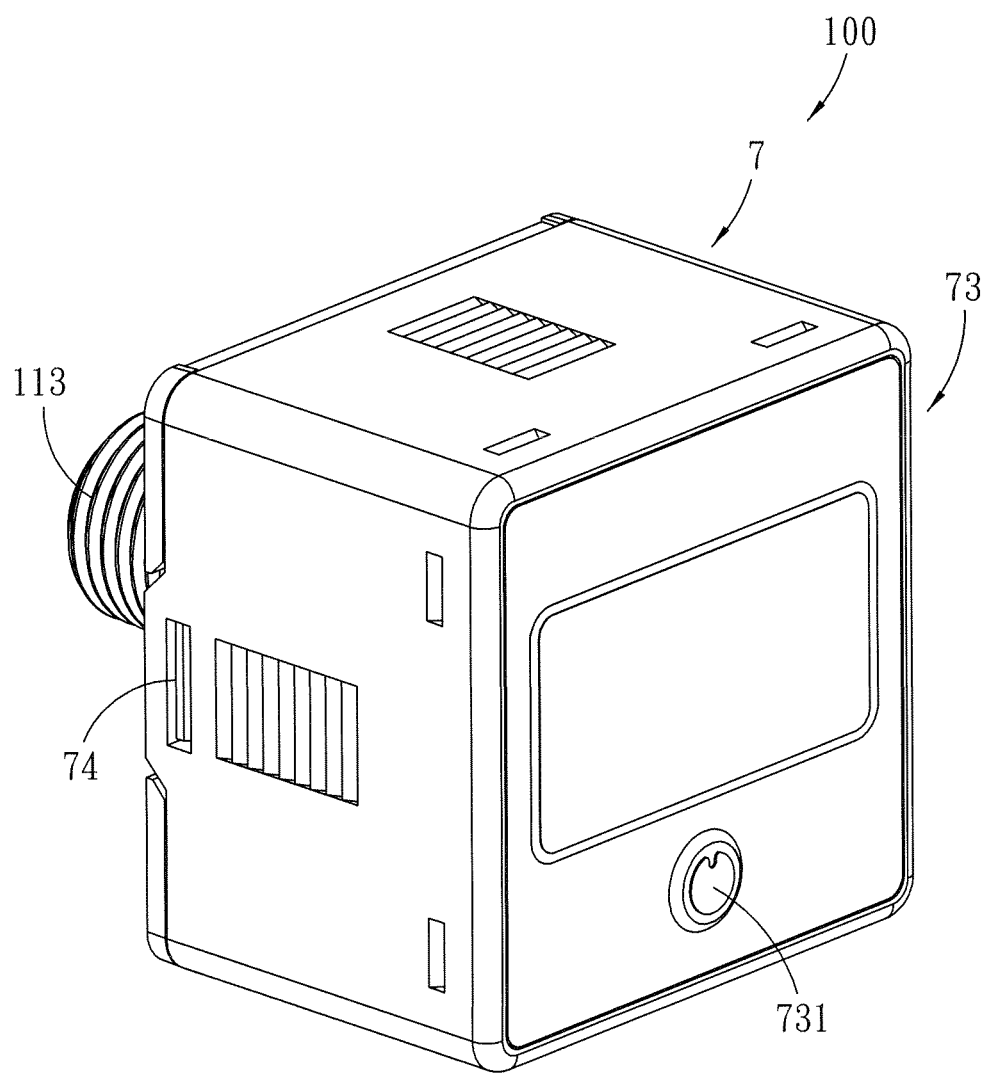
FIG. 1 is an assembled perspective view of a preferred embodiment of a digital pressure gauge, according to the invention.

FIG. 1 illustrates the preferred embodiment of a digital pressure gauge 100 according to the present invention. Further referring to FIGS. 2 to 4, the digital pressure gauge 100 is configured for coupling with an external fluid pipe 9, and includes a housing 1, a pressure sensing unit 2, a first electronic circuit unit 3, a second electronic circuit unit 4, a display module 5, a battery seat 6 and a cover 7.

The housing 1 includes a first body part 11, a frame-shaped second body part 12, a first seal unit 13 and a second seal unit 14. The first body part 11 and the second body part 12 cooperate to define an inner space 15. The first and second seal units 13 and 14 are made from rubber, and are in the form of O-shaped rings.

The first body part 11 is made of a rigid material (such as a metal), and includes a base wall 111, a surrounding wall 112 extending from a periphery of the base wall 111 toward the second body part 12, and an inlet 113 protruding outwardly from the base wall 111 and in a direction away from the second body part 12. The base wall 111, the surrounding wall 112 and the inlet 113 are formed integrally in this embodiment. The surrounding wall 112 is formed with two oppositely disposed first locking components 114 adjacent to the second body part 12, and two oppositely disposed second locking components 115 on an outer surface thereof adjacent to the base wall 111. In this embodiment, the first locking components 114 and the second locking components 115 are in the form of hooking components. The inlet 113 is formed with a thread on an outer surface thereof for coupling with the external fluid pipe 9, and is formed with a fluid passage 116 to permit flow of fluid from the external fluid pipe 9 into the housing 1.

The second body part 12 is formed with an opening 121 and two third locking components 122 that are disposed to respectively engage the two first locking components 114 for attaching the second body part 12 to the first body part 11. In this embodiment, the third locking components 122 are in the form of grooves. By engaging the third locking components 122 of the second body part 12 and the first locking components 114 of the first body part 11, and by disposing the first seal unit 13 between the first body part 11 and the second body part 12, moisture may be prevented from entering the housing 1.

Figure 3:
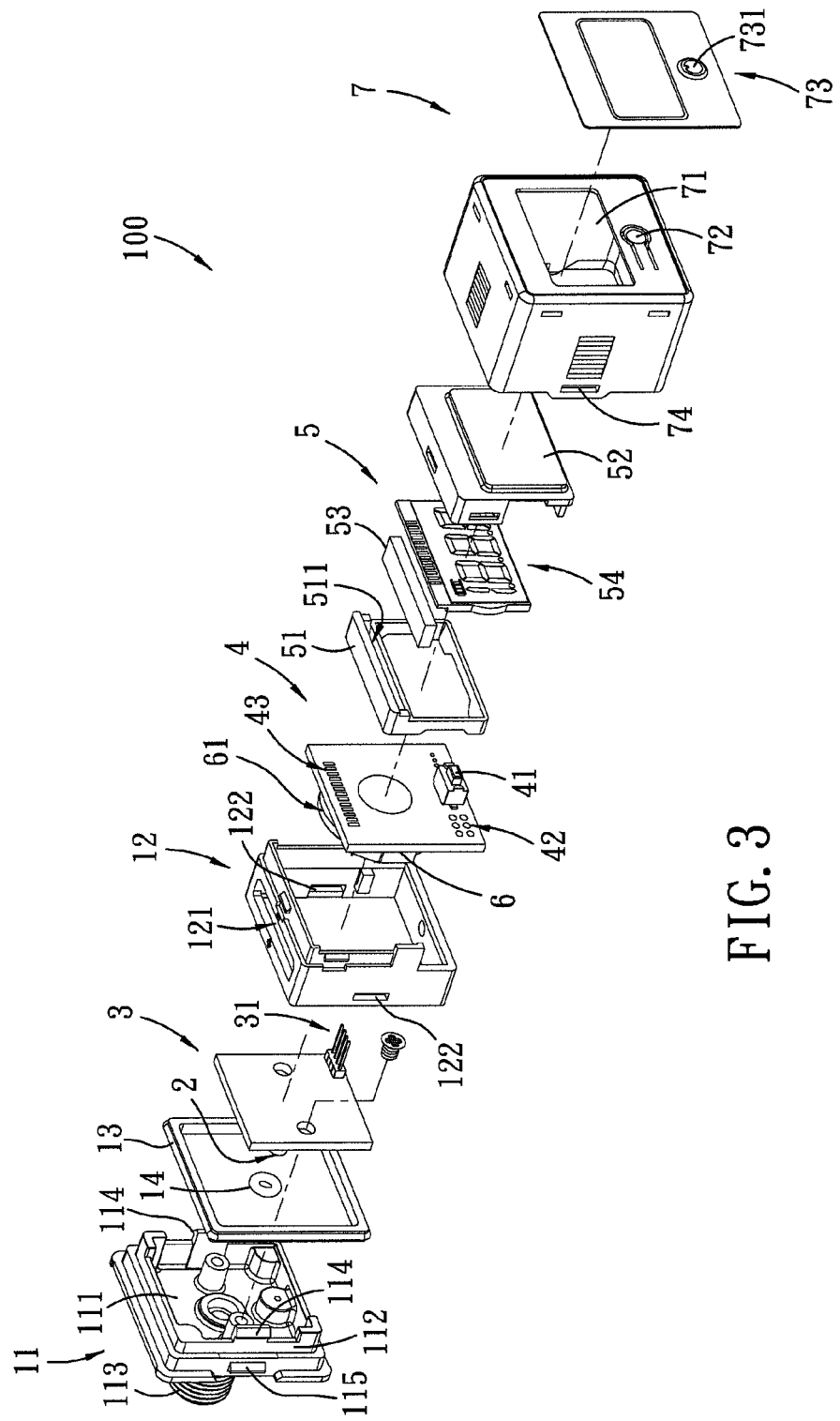
FIG. 3 is an exploded perspective view of the preferred embodiment.
Figure 4:
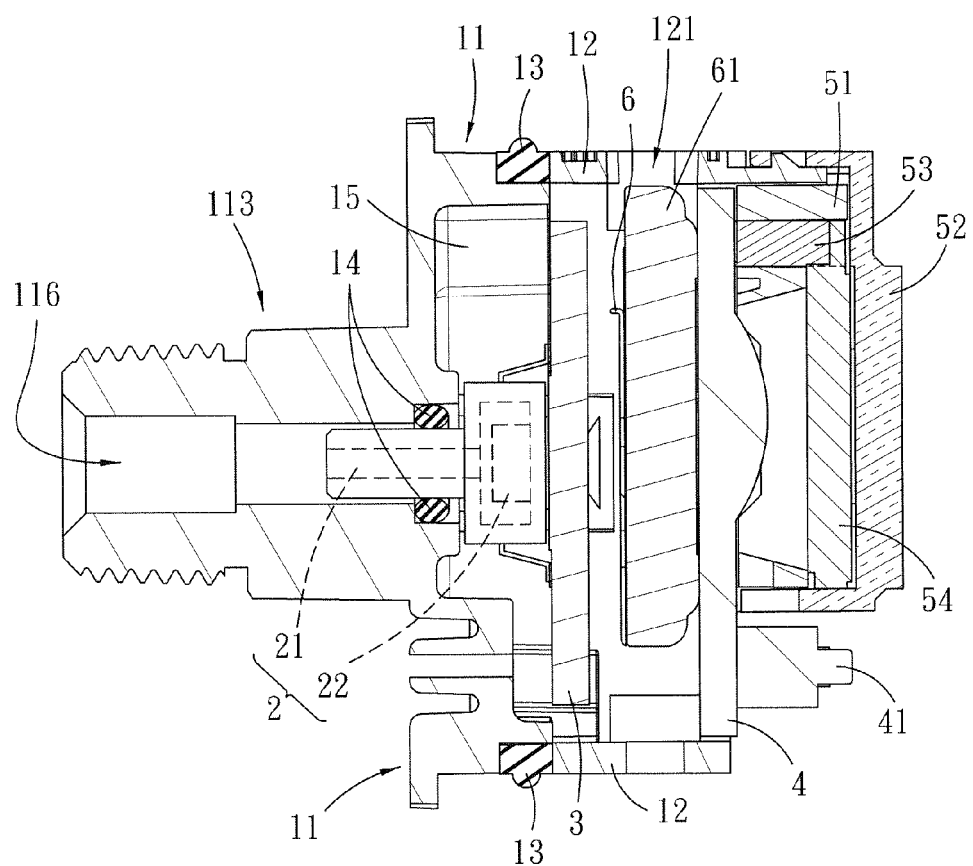
FIG. 4 is a sectional view taken along line IV-IV in FIG. 2.
Figure 5:
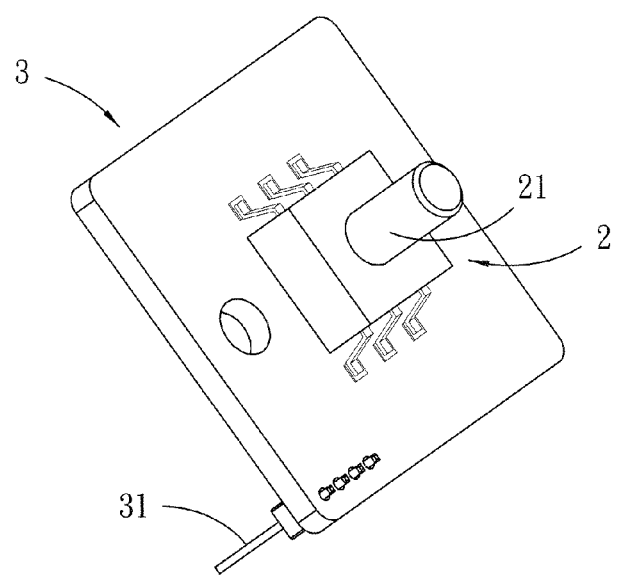
FIG. 5 is a perspective view of a pressure sensing unit mounted on a first electronic circuit unit.

Further referring to FIGS. 3 to 5, the pressure sensing unit 2 is disposed in the housing 1, and includes a fluid tube 21 in fluid communication with the inlet 113 and a pressure sensor 22. The fluid tube 21 extends into the fluid conduit 116 of the inlet 113 and allows entry of fluid from the external fluid pipe 9. The second seal unit 14 is disposed in one end of the fluid conduit 116 and around the fluid tube 21, thereby achieving an airtight seal. The pressure sensor 22 is operable to sense fluid pressure of the fluid flowing through the inlet 113, and to generate a pressure signal corresponding to the fluid pressure sensed thereby.

Figure 6:
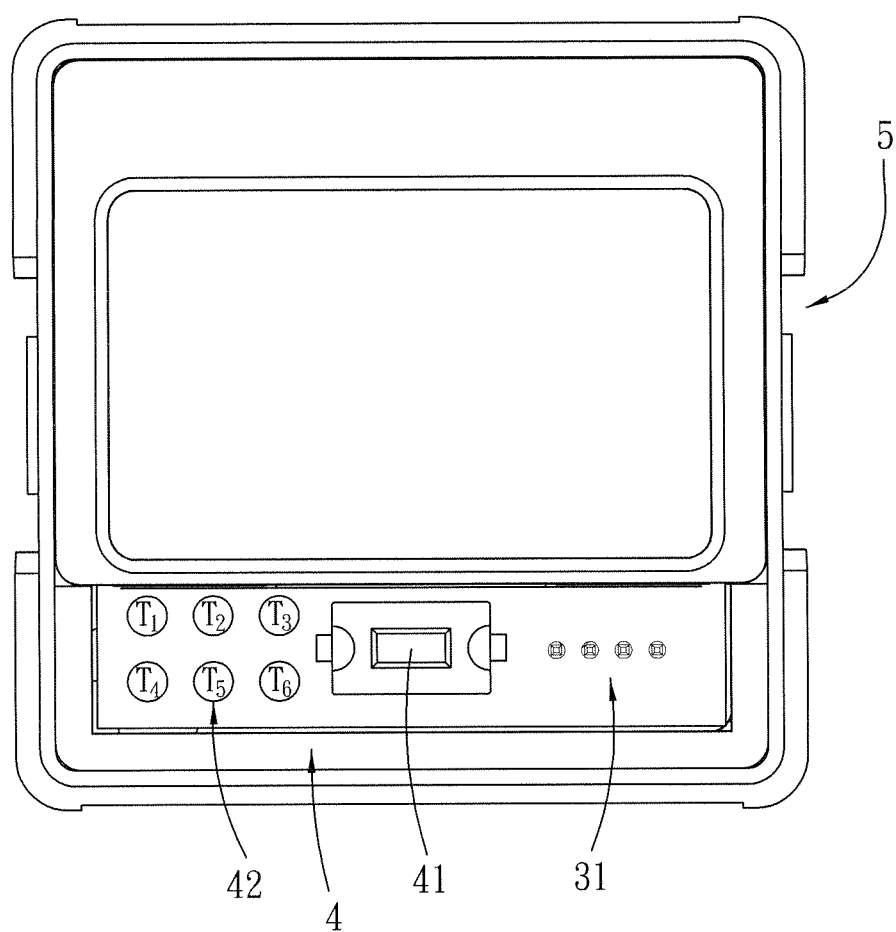
FIG. 6 is a front view of a display module and a second electronic circuit unit.

Referring to FIGS. 3, 4 and 6, the first electronic circuit unit 3 is disposed in the housing 1 and is mounted on the first body part 11. Specifically, the pressure sensing unit 2 is mounted on the first electronic circuit unit 3 at a position proximate to the inlet 113, and the first electronic circuit unit 3 is electrically connected to the pressure sensing unit 2 for receiving the pressure signal therefrom. Additionally, the first electronic circuit unit 3 includes four conductive pins 31 that face away from the pressure sensing unit 2 and that extend toward the second electronic circuit unit 4 for electrically connecting the first and second electronic circuit units 3 and 4.

The second electronic circuit unit 4 is disposed in the housing 1 and spaced apart from the first electronic circuit unit 3, and includes a power switch 41 for activating and deactivating the second electronic circuit unit 4, six test contacts 42 for testing functionality of the first and/or second electronic circuit units 3 and 4, and thirteen metal contacts 43 for electrically connecting the second electronic circuit unit 4 and the display module 5. The power switch 41, the test contacts 42 and the metal contacts 43 are disposed on a side of second electronic circuit unit 4 opposite to the first electronic circuit unit 3. The second electronic circuit unit 4 is operable to receive the pressure signal via the conductive pins 31, and to convert the pressure signal to a digital display signal.

Figure 2:
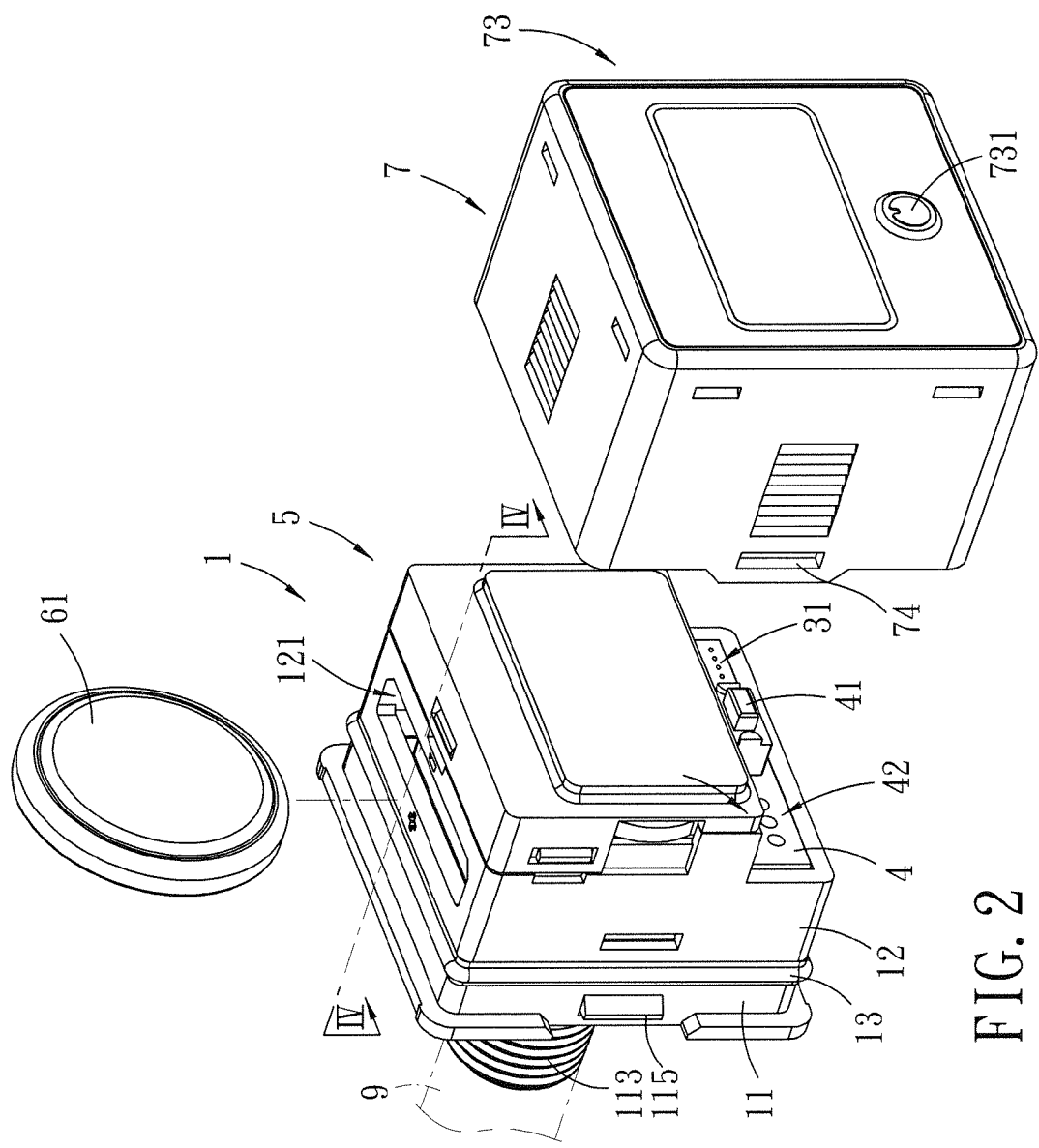
FIG. 2 is a partly exploded perspective view of the preferred embodiment.

Referring to FIGS. 2, 3 and 6, the display module 5 is disposed on and visible outwardly of the housing 1. The display module 5 includes a first frame body 51, a second frame body 52, a signal conductor 53 and a display panel 54. The first and second frame bodies 51 and 52 cooperate to contain the display panel 54 therein. The signal conductor 53 extends through a through hole 511 that is formed on the first frame body 51, and is electrically connected to the display panel 54 and the second electronic circuit unit 4. In this embodiment, the second frame body 52 is made of a transparent material (e.g., plastic or acrylic) such that the display panel 54 is visible therethrough. The signal conductor 53 is made of an electrically conductive rubber material, and serves to transmit electric signals. Two ends of the signal conductor 53 are connected to the metal contacts 43 and the display panel 54 respectively, so that the display signal may be transmitted from the second electronic circuit unit 4 to the display panel 54. However, this invention is not limited to the aforementioned signal transmission scheme.

Figure 7:
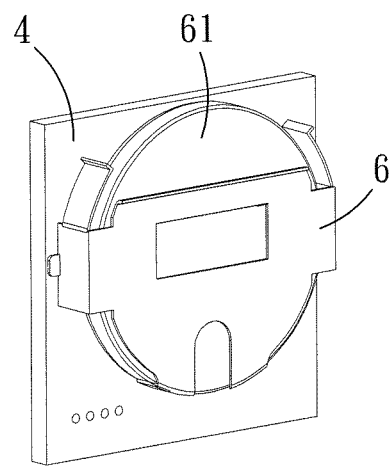
FIG. 7 is a perspective view of a battery seat, with a battery received therein, mounted on the second electronic circuit unit.
Figure 8:
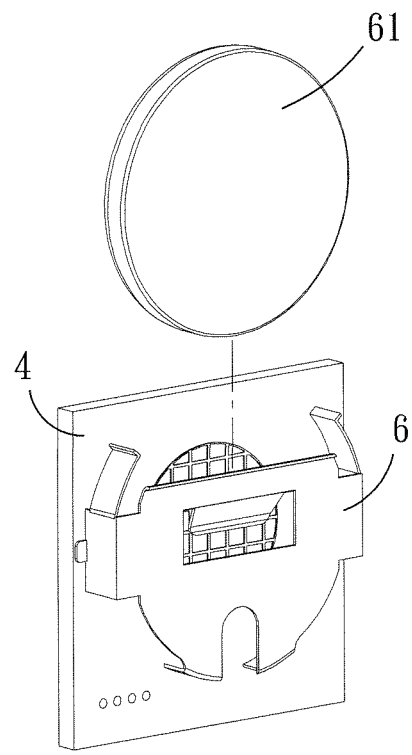
FIG. 8 is a perspective view illustrating the battery being removed from the battery seat.

Referring to FIGS. 4, 7 and 8, the battery seat 6 is disposed in the housing 1 between the first and second circuit units 3 and 4 for receiving a battery 61, and is mounted on and electrically connected to the second electronic circuit unit 4 in order to provide electricity thereto. The opening 121 of the second body part 12 is registered with the battery seat 6 to permit placement of the battery 61 in and removal of the battery from the battery seat 6 through the opening 121.

Referring back to FIGS. 1 to 3, the cover 7 is removably attached to the housing 1, and includes a display area 71 for viewing of the display panel 54 of the display module 5, a press component 72 for actuating the power switch 41, a transparent front part 73, and two fourth locking components 74. In this embodiment, the display area 71 is a window and is covered by the front part 73, and the fourth locking components 74 are in the form of grooves. A press button 731 is formed on the front part 73 and registered with the press component 72, such that pressing the press button 731 actuates the press component 72, and in turn drives the power switch 41. The fourth locking components 74 are configured to engage respectively the second locking components 115, thereby attaching the cover 7 to the first body part 11 and covering the second body part 12.

Referring to FIGS. 1, 2 and 6, the digital pressure gauge 100 can be actuated by pressing the press button 731 of the front part 73. The pressure sensing unit 2 senses fluid pressure of the fluid flowing through the inlet 113, and generates the pressure signal correspondingly. The pressure signal is transmitted to the second electronic circuit unit 4 via the first electronic circuit unit 3 and the conductive pins 31, and is converted into the digital display signal. The display signal is subsequently transmitted to the display panel 54 via the signal conductor 53. The display panel 54 is operable to display the display signal that corresponds to the sensed fluid pressure in a selected one of four available units (e.g., pounds per square inch (psi), bar, Kilogram force (Kgf) and megapascal (MPa)). The display panel 54 is also operable to indicate the remaining power of the battery 61, and to prompt replacement when the battery 61 is low on power.

In order to replace the battery 61 or to test the functionality of the digital pressure gauge 100, the cover 7 is detached from the housing 1, and such that the battery 61 can be removed from and placed onto the battery seat 6 through the opening 121, and such that the test contacts 42 are accessible for tests. In this embodiment, as shown in FIG. 6, one of the test contacts 42 numbered T1 is for inputting a specific electrical voltage, another one of the test contacts 42 numbered T5 is configured to output a corresponding electrical voltage, and other test contacts 42 are electrically connected to different parts of the digital pressure gauge 100 for acquiring functionality test results. However, the scope of this invention is not limited to the above description.

To sum up, this invention eliminates the need to detach numerous parts of the digital pressure gauge 100 in order to replace the battery 61 or to test functionality of the digital pressure gauge 100, requiring only detachment of the cover 7 from the housing 1. As a result, such operations are made relatively easier to perform.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A digital pressure gauge configured for coupling with an external fluid pipe, comprising:
a housing including an inlet for coupling with the external fluid pipe to permit flow of fluid from the external fluid pipe into said housing;
a pressure sensing unit disposed in said housing at a position corresponding to said inlet and operable to sense fluid pressure of the fluid flowing through said inlet and to generate a pressure signal corresponding to the fluid pressure sensed thereby;

a first electronic circuit unit disposed in said housing and electrically connected to said pressure sensing unit for receiving the pressure signal therefrom;

a second electronic circuit unit disposed in said housing, spaced apart from said first electronic circuit unit, and electrically connected to said first electronic circuit unit for receiving the pressure signal therefrom, said second electronic circuit unit being operable to convert the pressure signal to a display signal, said second electronic circuit unit including a power switch for activating and deactivating said second electronic circuit unit and at least one test contact for testing functionality of at least one of said first and second electronic circuit units;

a display module disposed on said housing and visible outwardly of said housing, said display module being electrically connected to said second electronic circuit unit for receiving the display signal therefrom;

a battery seat disposed in said housing for receiving a battery, and electrically connected to at least one of said first and second electronic circuit units;

said housing being formed with an opening registered with said battery seat to permit placement of the battery in and removal of the battery from said battery seat through said opening; and a cover removably attached to said housing, and including a display area for viewing of said display module, and a press component for actuating said power switch;

wherein, when said cover is removed from said housing, the battery is removable from and positionable onto said battery seat through said opening, and said test contact is accessible for tests.

2. The digital pressure gauge as claimed in claim 1, wherein:
said housing includes a first body part and a frame-shaped second body part that is assembled to said first body part;
said inlet is formed integrally with said first body part;
said opening is formed in said second body part; and
said cover is attached to said first body part and covers said second body part.

3. The digital pressure gauge as claimed in claim 2, wherein:
said first body part has a base wall and a surrounding wall extending from a periphery of said base wall toward said second body part, said inlet protruding outwardly from said base wall;
said base wall, said surrounding wall and said inlet are formed integrally;
said surrounding wall is formed with at least one first locking component adjacent to said second body part, and at least one second locking component on an outer surface thereof adjacent to said base wall;
said second body part is formed with at least one third locking component to engage said first locking component for attaching said second body part to said first body part; and
said cover is formed with at least one fourth locking component to engage said second locking component for attaching said cover to said first body part.

4. The digital pressure gauge as claimed in claim 1, wherein said first electronic circuit unit includes at least one conductive pin for electrically connecting said first and second electronic circuit units, said battery seat being mounted on and electrically connected to said second electronic circuit unit.

5. The digital pressure gauge as claimed in claim 1, wherein said display module includes:
a display panel;
a first frame body;
a second frame body cooperating with said first frame body for containing said display panel therein; and
a signal conductor extending through said first frame body and being electrically connected to said display panel and said second electronic circuit unit.

6. The digital pressure gauge as claimed in claim 1, wherein said pressure sensing unit is mounted on said first electronic circuit unit proximate to said inlet, and includes a pressure sensor and a fluid tube in fluid communication with said inlet.

* * * * *